(12) United States Patent
Nishiguchi et al.

(10) Patent No.: US 8,951,398 B2
(45) Date of Patent: Feb. 10, 2015

(54) CATIONIC ELECTRODEPOSITION COATING COMPOSITION

(75) Inventors: Shigeo Nishiguchi, Hiratsuka (JP); Akihiko Shimasaki, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 0 days.

(21) Appl. No.: 13/369,350

(22) Filed: Feb. 9, 2012

(65) Prior Publication Data

US 2012/0222962 A1 Sep. 6, 2012

(30) Foreign Application Priority Data

Mar. 4, 2011 (JP) ................................ 2011-047061

(51) Int. Cl.
*C25D 13/12* (2006.01)

(52) U.S. Cl.
USPC .......................................... 204/505; 523/415

(58) Field of Classification Search
USPC .......................................... 204/505; 523/415
See application file for complete search history.

(56) References Cited

U.S. PATENT DOCUMENTS

| | | | | |
|---|---|---|---|---|
| 3,627,720 | A | * 12/1971 | Hinton et al. | ................. 523/416 |
| 5,948,229 | A | * 9/1999 | Zwack et al. | ................. 204/502 |
| 6,500,912 | B1 | * 12/2002 | Corley | ........................... 528/113 |

FOREIGN PATENT DOCUMENTS

| | | |
|---|---|---|
| CN | 1162330 | 10/1997 |
| JP | 2011-6655 | 1/2011 |

* cited by examiner

*Primary Examiner* — Kishor Mayekar (74) *Attorney, Agent, or Firm* — Wenderoth, Lind & Ponack, L.L.P.

(57) ABSTRACT

The present invention provides a cationic electrodeposition coating composition that has excellent throwing power and that can form a thin film with excellent finish and anti-corrosion properties. The composition has a cationic epoxy resin (A) and a blocked polyisocyanate (B), the cationic epoxy resin (A) obtained by reacting an epoxy resin (A1) with an amino group-containing compound (A2). The epoxy resin (A1) having a catechol skeleton structure (a) and obtained by reacting an epoxy resin (a1) containing at least one epoxy group per molecule and having an epoxy equivalent of 180 to 500 with a phenolic hydroxyl group-containing compound (a2) containing at least one phenolic hydroxyl group per molecule in amounts wherein the ratio of the number of moles of epoxy groups in the epoxy resin (a1) to the number of moles of phenolic hydroxyl groups in the phenolic hydroxyl group-containing compound (a2) is 1.3 to 2.0.

2 Claims, 1 Drawing Sheet

CATIONIC ELECTRODEPOSITION COATING COMPOSITION

CROSS REFERENCE OF RELATED APPLICATION

This application claims priority to Japanese Patent Application No. 2011-047061 filed on Mar. 4, 2011, which is incorporated by reference in its entirety.

TECHNICAL FIELD

The present invention relates to a cationic electrodeposition coating composition that has excellent throwing power and that can form a thin film (in particular, having a dry film thickness of 10 µm) with excellent finish (heat flow properties) and anti-corrosion properties.

BACKGROUND ART

In electrodeposition coating using a cationic electrodeposition coating composition, attempts have been made to maintain the inner film thickness of bag portions and gap portions to ensure anti-corrosion properties, and to optimize or make uniform the outer film thickness (for example, to ensure the film thickness of a portion where finish and anti-corrosion properties are valued) for improving the quality of automobile bodies and reducing the cost.

However, in a coating film obtained by electrodeposition using a conventional cationic electrodeposition coating composition, a reduction in the coating film thickness may result in a poor finish due to an uneven substrate and a reduction in heat flow properties. Further, for the purpose of improving the finish, if the amount of plastic components used in the coating film is increased to improve heat flow properties during heating and drying, polarization resistance is reduced, whereby the "throwing power" and anti-corrosion properties of the coating film tend to be lowered.

In view of these circumstances, the development of a cationic electrodeposition coating composition that has excellent throwing power and that can form a thin coating film (in particular, having a dry film thickness of 10 µm) with excellent finish (heat flow properties) and anti-corrosion properties has been desired.

Patent Document 1 discloses that a cationic electrodeposition coating composition comprising an amino group-containing modified epoxy resin (A), a phenolic hydroxyl group-containing resin (B), and a blocked polyisocyanate curing agent (C) has excellent throwing power, and can form a coating film with excellent finish, in particular, a coating film having a dry film thickness of 15 µm, with excellent finish and anti-corrosion properties. However, the disclosed composition is not fully satisfactory in terms of all of throwing power, finish (heat flow properties) and anti-corrosion properties of a thinner coating film (in particular, having a dry film thickness of 10 µm).

PRIOR ART DOCUMENTS

Patent Document 1: Japanese Unexamined Patent Publication No. 2011-6655

DISCLOSURE OF THE INVENTION

Technical Problem

An object of the present invention is to provide a cationic electrodeposition coating composition that has excellent throwing power, and that can form a thin film (in particular, having a dry film thickness of 10 µm) with excellent finish (heat flow properties) and anti-corrosion properties.

Solution to Problem

The present inventors conducted extensive research to achieve the above object. As a result, the inventors found that the above object can be achieved by a cationic electrodeposition coating composition comprising: a cationic epoxy resin (A) obtained by reacting an amino group-containing compound (A2) with an epoxy resin (A1) having a catechol skeleton structure (a) in a part of the molecule; and a blocked polyisocyanate (B). The present invention has been accomplished, based on this finding.

More specifically, the present invention relates to the following items:

1. A cationic electrodeposition coating composition comprising a cationic epoxy resin (A) and a blocked polyisocyanate (B), the cationic epoxy resin (A) being obtained by reacting an epoxy resin (A1) with an amino group-containing compound (A2), and the epoxy resin (A1) having, in a part of the molecule, a catechol skeleton structure (a) represented by Formula (1) below Formula (1)

wherein R represents a hydrogen atom or an alkyl group having 1 to 6 carbon atoms, and being obtained by reacting an epoxy resin (a1) containing at least one epoxy group per molecule and having an epoxy equivalent of 180 to 500 with a phenolic hydroxyl group-containing compound (a2) containing at least one phenolic hydroxyl group per molecule in amounts such that the ratio of the number of moles of epoxy groups in the epoxy resin (a1) to the number of moles of phenolic hydroxyl groups in the phenolic hydroxyl group-containing compound (a2) is in the range of 1.3 to 2.0.

2. The cationic electrodeposition coating composition according to item 1, wherein the epoxy resin (a1) comprises an epoxy resin obtained by reacting epichlorohydrin with at least one member selected from the group consisting of catechol and alkyl catechols.

3. The cationic electrodeposition coating composition according to item 1, wherein the phenolic hydroxyl group-containing compound (a2) comprises at least one member selected from the group consisting of catechol and alkyl catechols.

4. The cationic electrodeposition coating composition according to any one of items 1 to 3, wherein the cationic epoxy resin (A) contains the catechol skeleton structure (a) in an amount of 3 to 65 mass %, based on the solids content of the resin (A).

5. The cationic electrodeposition coating composition according to any one of items 1 to 3, wherein the cationic epoxy resin (A) contains the catechol skeleton structure (a) in an amount of 5 to 40 mass %, based on the solids content of the resin (A).

6. The cationic electrodeposition coating composition according to any one of items 1 to 5, wherein R in Formula (1) represents an alkyl group having 4 to 6 carbon atoms.

7. An electrodeposition coating method comprising the steps of immersing a substrate in an electrodeposition bath wherein the cationic electrodeposition coating composition of any one of items 1 to 6 is used as the electrodeposition bath, and applying a current using the substrate as a cathode.

8. A coated article obtained by electrocoating the substrate by the method of item 7.

Advantageous Effects of the Invention

The cationic electrodeposition coating composition of the present invention has excellent "throwing power" because the catechol skeleton structure (a) introduced into the cationic epoxy resin (A) hastens initial deposition of the electrodeposited coated film, and provides satisfactory fused bonding of the coated film to thereby enable application of a high voltage. Furthermore, due to improved flexibility of the coating film and heat flow properties, a coated article with "excellent thin film finish" and "excellent thin film anti-corrosion properties (having a dry film thickness of 10 μm)" can be obtained.

DESCRIPTION OF EMBODIMENTS

The present invention provides a cationic electrodeposition coating composition comprising: a cationic epoxy resin (A) and a blocked polyisocyanate (B), the epoxy resin (A) being obtained by reacting an amino group-containing compound (A2) with an epoxy resin (A1) having a catechol skeleton structure (a) in a part of the molecule. The present invention is described below in more detail.

Cationic Epoxy Resin (A)

The cationic epoxy resin (A) in the present invention is obtained by reacting an amino group-containing compound (A2) with an epoxy resin (A1) having a catechol skeleton structure (a) represented by Formula (1) below in a part of the molecule.

Formula (1)

(wherein R represents a hydrogen atom or an alkyl group having 1 to 6 carbon atoms).

When R in the catechol skeleton structure represented by Formula (1) is an alkyl group having 4 to 6 carbon atoms, excellent fused bonding during the coating film formation will occur, and is thus preferable.

Epoxy Resin (A1) Having a Catechol Skeleton Structure (a) in a Part of the Molecule The epoxy resin (A1) is obtained by reacting an epoxy resin (a1) containing at least one epoxy group per molecule and having an epoxy equivalent of 180 to 500 with a phenolic hydroxyl group-containing compound (a2) containing at least one phenolic hydroxyl group per molecule in amounts such that the ratio of the number of moles of epoxy groups in the epoxy resin (a1) to the number of moles of phenolic hydroxyl groups in the phenolic hydroxyl group-containing compound (a2) is in the range of 2.0 to 1.3.

The catechol skeleton structure (a) is typically derived from the epoxy resin (a1) and/or the compound (a2), and introduced into the epoxy resin (A1). For example, the resin (a1) may contain an epoxy group obtained by reacting epichlorohydrin with at least one member selected from catechol and alkyl catechols, whereby the catechol skeleton structure (a) can be introduced into the resin skeleton of the epoxy resin (A1).

Specific examples of the epoxy resin (a1) include EPICLON HP-820 (produced by DIC Cos., Ltd.). Examples of alkyl catechols include 4-tert-butylcatechol, 4-methylcatechol, 2-methylcatechol, and the like.

As an epoxy resins (a1) other than the above, an epoxy resin obtained by reacting a polyphenol compound with epichlorohydrin is preferably used.

Examples of polyphenol compounds that can be used to form such epoxy resins include bis(4-hydroxyphenyl)-2,2-propane [bisphenol A], bis(4-hydroxyphenyl)methane [bisphenol F], bis(4-hydroxycyclohexyl)methane [hydrogenated bisphenol F], 2,2-bis(4-hydroxycyclohexyl)propane [hydrogenated bisphenol A], 4,4'-dihydroxybenzophenone, bis(4-hydroxyphenyl)-1,1-ethane, bis(4-hydroxyphenyl)-1,1-isobutane, bis(4-hydroxy-2 or 3-tert-butyl phenyl)-2,2-propane, bis(2-hydroxynaphthyl)methane, tetra(4-hydroxyphenyl)-1,1,2,2-ethane, 4,4'-dihydroxydiphenylsulfone, phenol novolac, cresol novolac, and the like.

As an epoxy resin obtained by reacting a polyphenol compound with epichlorohydrin, a resin derived from bisphenol A and represented by the following Formula (2)

Formula (2)

wherein q is 0 to 2 is particularly preferable.

Examples of commercially available products of the epoxy resin include those sold under the trade names "jER828EL" and "jER1001" by Japan Epoxy Resins Co., Ltd.

Such epoxy resins (a1) can be used singly or as a mixture of two or more.

When the phenolic hydroxyl group-containing compound (a2) contains at least one member selected from catechol and alkyl catechols, the catechol skeleton structure (a) can be introduced into the resin skeleton of the epoxy resin (A1).

Examples of the alkyl catechols include 4-tert-butylcatechol, 4-methylcatechol, 2-methylcatechol, and the like.

Examples of phenolic hydroxyl group-containing compounds (a2) other than the above include any compound that contains at least one phenolic hydroxyl group per molecule. Examples thereof include bis(4-hydroxyphenyl)-2,2-propane [bisphenol A], bis(4-hydroxyphenyl)methane [bisphenol F], bis(4-hydroxycyclohexyl)methane [hydrogenated bisphenol F], 2,2-bis(4-hydroxycyclohexyl)propane [hydrogenated bisphenol A], 4,4'-dihydroxybenzophenone, bis(4-hydroxyphenyl)-1,1-ethane, bis(4-hydroxyphenyl)-1,1-isobutane, bis(4-hydroxy-2 or 3-tert-butylphenyl)-2,2-propane, bis(2-hydroxynaphthyl)methane, tetra(4-hydroxyphenyl)-1,1,2,2-ethane, 4,4'-dihydroxydiphenylsulfone, phenol novolac, cresol novolac, and the like.

Such phenolic hydroxyl group-containing compounds (a2) can be used singly or as a mixture of two or more.

With respect of the proportion of each component in the production of the epoxy resin (A1), the epoxy resin (a1) is mixed with the phenolic hydroxyl group-containing compound (a2) in an amount such that the ratio of the number of moles of epoxy groups in the epoxy resin (a1) to the number of moles of phenolic hydroxyl groups in the phenolic hydroxyl group-containing compound (a2) is in the range of 2.0 to 1.3, preferably 2.0 to 1.35. When the molar ratio is higher than 2.0, low corrosion resistance will occur. When the molar ratio is smaller than 1.3, poor finish will occur. The use of the epoxy resin (a1) and the phenolic hydroxyl group-containing compound (a2) in a ratio within the above-mentioned range is preferable in view of enhanced corrosion resistance and finish of the obtained coating film.

An epoxy resin (A1) having a catechol skeleton structure (a) represented by Formula (1) in a part of the molecule can typically be obtained by reacting the epoxy group (a1) and the phenolic hydroxyl group-containing compound (a2) in the presence of a catalyst, for example, a tertiary amine such as dimethylbenzylamine or tributylamine, or a quaternary ammonium salt such as tetraethylammonium bromide or tetrabutylammonium bromide, at a temperature of 80 to 200° C., preferably 90 to 180° C., for 1 to 6 hours, preferably 1 to 5 hours.

The epoxy resin (A1) may be a product of partial reaction of the epoxy resin (a1) and the phenolic hydroxyl group-containing compound (a2) with polyol, polyether polyol, polyester polyol, polyamide amine, polycarboxylic acid, a polyisocyanate compound, or the like; or it may be a graft polymerization product of a lactone such as ε-caprolactone, an acrylic monomer, or the like.

In the production of the epoxy resin (A1), an organic solvent can be optionally used. Examples of such organic solvents include toluene, xylene, cyclohexane, n-hexane and like hydrocarbon solvents; methyl acetate, ethyl acetate, butyl acetate and like ester solvents; acetone, methyl ethyl ketone, methyl isobutyl ketone, methyl amyl ketone and like ketone solvents; dimethyl formamide, dimethyl acetamide and like amide solvents; methanol, ethanol, n-propanol, isopropanol and like alcohol solvents; phenylcarbinol, methylphenylcarbinol and like aromatic alkyl alcohol solvents; ethylene glycol monobutyl ether, diethylene glycol monoethyl ether and like ether alcohol-based compounds; and mixtures thereof.

Amine Compound (A2)

The cationic epoxy resin (A) for use in the present invention can be produced by addition reaction of the epoxy resin (A1) with the amine compound (A2). The amine compound (A2) is a cationizing component that introduces an amino group into an epoxy resin to cationize the epoxy resin, and that contains at least one active hydrogen that reacts with an epoxy group.

Examples of the amino compound (A2) used for this purpose include mono- or dialkylamines such as monomethylamine, dimethylamine, monoethylamine, diethylamine, monoisopropylamine, diisopropylamine, monobutylamine and dibutylamine; alkanolamines such as monoethanolamine, diethanolamine, mono(2-hydroxypropyl)amine, di(2-hydroxypropyl)amine, monomethylaminoethanol and monoethylaminoethanol; alkylenepolyamines such as ethylenediamine, propylenediamine, butylenediamine, hexamethylenediamine, tetraethylenepentamine, pentaethylenehexamine, diethylaminopropylamine, diethylenetriamine, and triethylenetetramine, and ketiminated products of these polyamines; alkyleneimines such as ethyleneimine and propyleneimine; and cyclic amines such as piperazine, morpholine and pyrazine. As such amine compounds, amines obtained by ketiminating primary amines can also be used. Such amine compounds (A2) can be used singly or as a mixture of two or more.

The proportion of each component in the addition reaction of the epoxy resin (A1) and the amine compound (A2) is not particularly limited, and may be suitably changed according to the purpose of use of the electrodeposition coating composition, etc. The amount of the epoxy resin (A1) is typically 70 to 98 mass %, preferably 75 to 96 mass %; and the amount of the amine compound (A2) is typically 2 to 30 mass %, preferably 4 to 25 mass %, based on the total solids mass of the epoxy resin (A1) and the amine compound (A2).

The addition reaction is typically carried out in an appropriate solvent at a temperature of 80 to 170° C., preferably 90 to 150° C. for 1 to 6 hours, preferably 1 to 5 hours. Examples of solvents that can be used in the reaction include hydrocarbon solvents such as toluene, xylene, cyclohexane and n-hexane; ester solvents such as methyl acetate, ethyl acetate and butyl acetate; ketone solvents such as acetone, methyl ethyl ketone, methyl isobutyl ketone and methyl amyl ketone; amide solvents such as dimethylformamide and dimethylacetamide; alcohol solvents such as methanol, ethanol, n-propanol and isopropanol; aromatic alkyl alcohols such as phenylcarbinol and methylphenylcarbinol; ether alcohol compounds such as ethylene glycol monobutyl ether and diethylene glycol monoethyl ether; and mixtures thereof.

The cationic epoxy resin (A) preferably contains the catechol skeleton structure (a) in an amount of 3 to 65 mass %, preferably 5 to 40 mass %, based on the solids content of the resin (A). The use of the cationic epoxy resin (A) that contains the catechol skeleton structure (a) in an amount with the above-mentioned range, based on the solids content, is preferable in view of inhibiting the reduction of fused bonding of the deposited coating film, water dispersibility, and throwing power.

Blocked Polyisocyanate (B)

Because the cationic electrodeposition coating composition of the present invention comprises a combination of cationic epoxy resin (A) and blocked polyisocyanate (B), a thermosetting cationic electrodeposition coating composition can be produced.

The blocked polyisocyanate (B) is an addition-reaction product of a polyisocyanate compound and an isocyanate blocking agent in almost stoichiometric amounts. Polyisocyanate compounds usable in the blocked polyisocyanate (B) may be known compounds. Examples of such polyisocyanate compounds include aromatic, aliphatic or alicyclic polyisocyanate compounds such as tolylene diisocyanate, xylylene diisocyanate, phenylene diisocyanate, diphenylmethane-2,2'- diisocyanate, diphenylmethane-2,4'-diisocyanate, diphenylmethane-4,4'-diisocyanate, crude MDI (polymethylene polyphenyl isocyanate), bis(isocyanatemethyl)cyclohexane, tetramethylene diisocyanate, hexamethylene diisocyanate, methylene diisocyanate, isophorone diisocyanate, etc.; cyclopolymers or biurets of these polyisocyanate compounds; and combinations thereof.

Aromatic polyisocyanate compounds such as tolylene diisocyanate, xylylene diisocyanate, phenylene diisocyanate, diphenylmethane-2,4'-diisocyanate, diphenylmethane-4,4'-diisocyanate and crude MDI are particularly preferable in view of anticorrosion properties.

The isocyanate blocking agent is added to isocyanate groups of a polyisocyanate compound to block the isocyanate groups. Preferably, the blocked polyisocyanate compound obtained by such an addition is stable at room temperature; however, when heated to the baking temperature of the coated film (usually 100 to 200° C.), the blocking agent dissociates to regenerate free isocyanate groups.

Examples of blocking agents that can be used in the blocked polyisocyanate (B) include methylethylketoxime, cyclohexanone oxime and like oxime compounds; phenol, para-t-butylphenol, cresol and like phenol compounds; n-butanol, 2-ethylhexanol and like aliphatic alcohols; phenylcarbinol, methylphenylcarbinol and like aromatic alkyl alcohols; ethylene glycol monobutyl ether, diethylene glycol monoethyl ether and like ether alcohol compounds; ε-caprolactam, γ-butyrolactam and like lactam compounds; etc.

The proportions of the cationic epoxy resin (A) and the blocked polyisocyanate (B) in the cationic electrodeposition coating composition of the present invention are such that the amount of component (A) is typically 50 to 90 mass %, preferably 60 to 85 mass %; and the amount of component (B) is typically 10 to 50 mass %, preferably 15 to 40 mass %, based on the total solids mass of the components (A) and (B).

The above proportions are preferable to achieve excellent coating properties, such as coating composition stability and electrodeposition coating applicability onto hot dip galvanized steel sheets; and to obtain a coated article that comprises a cationic electrodeposition coating film having excellent finish and anti-corrosion properties, in particular, excellent finish and anti-corrosion properties at a dry film thickness of 10 μm.

In the production of the cationic electrodeposition coating composition, the cationic epoxy resin (A) and the blocked polyisocyanate (B) are fully mixed, if necessary, with various additives such as surfactants and surface-adjusting agents, organic solvents, etc., to thereby prepare a resin. The prepared resin is rendered water-soluble or water-dispersible with an organic carboxylic acid or the like to thereby obtain an emulsion.

The neutralization of the prepared resin may generally be performed using a known organic carboxylic acid. Acetic acid, formic acid, lactic acid, and mixtures thereof are particularly preferable. Subsequently, a pigment dispersion paste is added to the emulsion, which is diluted with ionized water or the like to produce a cationic electrodeposition coating composition with a bath solids content of typically 5 to 40 mass %, preferably 8 to 25 mass %, and a pH of 1.5 to 9.0, preferably 2.0 to 6.5.

The pigment-dispersed paste contains a coloring pigment, a rust-preventive pigment, an extender pigment, or the like that has been dispersed as fine particles therein. The paste may be prepared, for example, by incorporating a pigment dispersion resin, a neutralizer, a pigment, etc., and subjecting the mixture to dispersion treatment in a dispersing mixer, such as a ball mill, a sand mill or a pebble mill.

Known resins may be used as the pigment dispersion resin. Examples thereof include base resins having hydroxyl and cationic groups, tertiary amine-type epoxy resins, quaternary ammonium salt-type epoxy resins, tertiary sulfonium salt-type epoxy resins, and like resins.

There is no particular limitation on the pigment, and examples of usable pigments include coloring pigments such as titanium oxide, carbon black, and red iron oxide; extender pigments such as clay, mica, baryta, calcium carbonate, and silica; and rust-preventive pigments such as aluminum phosphomolybdate, aluminum tripolyphosphate, and zinc oxide (zinc white).

In order to inhibit corrosion or prevent rust, bismuth compounds may be used. Examples of such bismuth compounds include bismuth oxide, bismuth hydroxide, basic bismuth carbonate, bismuth nitrate, bismuth silicate, organic acid bismuth, and the like.

In order to improve the curability of the coating film, an organic tin compound, such as dibutyltin dibenzoate, dioctyltin oxide, or dibutyltin oxide may be used. However, in place of these organic tin compounds, a rust-preventive pigment and/or a bismuth compound, such as the above-mentioned zinc oxide (zinc white), may be used in an increased amount and/or used in the form of fine particles in order to improve the curability of the coating film. The amount of the pigments used is preferably 1 to 100 parts by mass, particularly 10 to 50 parts by mass, per 100 parts by mass of the total solids of the base resin and the curing agent.

Examples of substrates to which the cationic electrodeposition coating composition of the present invention is applied include automobile bodies, parts for two-wheeled vehicles, home appliances, other appliances, etc. The substrates are not particularly limited, as long as they are made of metal. Examples of metal steel plates as substrates include cold-rolled steel plates, hot dip galvanized steel plates, electrogalvanized steel plates, electrolytic zinc-iron duplex-plated steel plates, organic composite-plated steel plates, aluminium substrates, magnesium substrates, and the like. If necessary, these metal plates may be washed using alkali degreasing, etc.; and subjected to surface treatment, such as phosphate chemical conversion treatment or chromate treatment.

The cationic electrodeposition coating composition may be applied to a desired substrate surface by electrodeposition coating. Thus, the present invention provides an electrodeposition coating method using the above-mentioned electrodeposition coating composition as an electrodeposition bath, the method comprising the steps of immersing a substrate in the electrodeposition bath and applying a current using the substrate as a cathode.

More specifically, cationic electrodeposition coating is generally performed by adjusting the temperature of an electrodeposition bath to 15 to 35° C., and applying a current at a load voltage of 100 to 400V using a substrate as a cathode. The electrodeposition bath comprises an electrodeposition coating composition diluted with deionized water or the like to a solids content of about 5 to 40 mass %, and having a pH adjusted to 5.5 to 9.0. In general, after the electrodeposition coating, the coated substrate is fully washed with ultrafiltrate (UF filtrate), reverse osmosis water (RO water), industrial water, deionized water, or the like, to remove the cationic electrodeposition coating composition excessively adhered to the substrate.

The thickness of the electrodeposition coated film is not particularly limited, but is generally 5 to 40 μm, preferably 7 to 30 μm, based on the thickness of the dry coating film. The bake-drying of the coating film is performed by heating the electrodeposition coating film at a surface temperature of the coated article of typically 110° C. to 200° C., preferably 140° C. to 180° C. for typically 10 to 180 minutes, preferably 20 to 50 minutes by means of a dryer, such as an electric hot-air dryer or a gas hot-air dryer. By such bake-drying, a cured coating film can be obtained.

The cationic electrodeposition coating film obtained by bake-drying as above has a center line mean roughness (Ra) of less than 0.30 µm, preferably less than 0.25 µm (at a cutoff of 0.8 mm), particularly at a dry film thickness of 10 µm; and has excellent finish. The center line mean roughness (Ra) in the roughness curve is defined by JIS B 601.

EXAMPLES

The present invention is explained in detail below with reference to Production Examples, Examples, and Comparative Examples; however, the present invention is not limited thereto. In the Examples, "parts" and "%" are by mass.

Preparation of Cationic Epoxy Resin (A)

Production Example 1

Production Example of Base Resin No. 1 (For Examples)

760 parts of jER828EL (Note 1), 450 parts of EPICLON HP-820 (Note 2), 456 parts of Bisphenol A, and 0.2 parts of dimethylbenzylamine were placed in a 2-liter separable flask equipped with a thermometer, a reflux condenser, and a stirrer. The mixture was allowed to react at 120° C. until the epoxy equivalent became 833. Subsequently, 110 parts of ethylene glycol monobutyl ether was added to the mixture, and then allowed to react at 100° C.

After 158 parts of diethanolamine and 95 parts of ketiminized diethylenetriamine (purity: 84%, a methyl isobutyl ketone solution) were added and allowed to react at 120° C. for 4 hours, 289 parts of ethylene glycol monobutyl ether was added. A solution of base resin No. 1 with a resin solids content of 80% was thus obtained. The base resin No. 1 had an amine value of 64 mg KOH/g, a number average molecular weight of 1,900, and a catechol skeleton structure content of 18%.

The ratio of the number of moles of epoxy groups in the epoxy resin (a1) to the number of moles of phenolic hydroxyl groups in the phenolic hydroxyl group-containing compound (a2) was 1.5.

(Note 1) jER828EL: trade name, an epoxy resin, produced by Japan Epoxy Resin Co., Ltd., epoxy equivalent: 190, number average molecular weight: 380
(Note 2) EPICLON HP-820: trade name, an epoxy resin obtained by reacting epichlorohydrin with at least one member selected from the group consisting of catechol and alkyl catechols, a product of DIC Corporation, epoxy equivalent: 225, number average molecular weight: 450

Production Example 2

Production Example of Base Resin No. 2 Solution (For Examples)

1,140 parts of jER828EL (Note 1), 220 parts of catechol, and 0.2 parts of dimethylbenzylamine were placed in a 2-liter separable flask equipped with a thermometer, a reflux condenser, and a stirrer. The mixture was allowed to react at 120° C. until the epoxy equivalent became 680. Subsequently, 110 parts of ethylene glycol monobutyl ether was added, and the mixture was allowed to react at 100° C.

Subsequently, 158 parts of diethanolamine and 95 parts of ketiminized diethylenetriamine (purity: 84%, a methyl isobutyl ketone solution) were added, and the mixture was allowed to react at 120° C. for 4 hours, after which 211 parts of ethylene glycol monobutyl ether was added. A solution of base resin No. 2 with a resin solids content of 80 mass % was thus obtained. The base resin No. 2 had an amine value of 76 mg KOH/g, a number average molecular weight of 1,500, and a catechol skeleton structure of 14%.

The ratio of the number of moles of epoxy groups in the epoxy resin (a1) to the number of moles of phenolic hydroxyl groups in the phenolic hydroxyl group-containing compound (a2) was 1.5.

Production Example 3

Production Example of Base Resin No. 3 Solution (For Examples)

1,140 parts of jER828EL (Note 1), 332 parts of tert-butyl-catechol and 0.2 parts of dimethylbenzylamine were placed in a 2-liter separable flask equipped with a thermometer, a reflux condenser, and a stirrer. The mixture was allowed to react at 120° C. until the epoxy equivalent became 736. Subsequently, 110 parts of ethylene glycol monobutyl ether was added, and the mixture was allowed to react at 100° C.

Subsequently, 158 parts of diethanolamine and 95 parts of ketiminized diethylenetriamine (purity: 84%, a methyl isobutyl ketone solution) were added, and the mixture was allowed to react at 120° C. for 4 hours, after which 241 parts of ethylene glycol monobutyl ether was added. A solution of base resin No. 3 with a resin solids content of 80% was thus obtained. The base resin No. 3 had an amine value of 71 mg KOH/g, a number average molecular weight of 1,700, and a catechol skeleton structure of 20%.

The ratio of the number of moles of epoxy groups in the epoxy resin (a1) to the number of moles of phenolic hydroxyl groups in the phenolic hydroxyl group-containing compound (a2) was 1.5.

Production Example 4

Production Example of Base Resin No. 4 Solution (For Examples)

1,634 parts of jER828EL (Note 1), 548 parts of tert-butyl-catechol, and 0.2 parts of dimethylbenzylamine were placed in a 2-liter separable flask equipped with a thermometer, a reflux condenser, and a stirrer. The mixture was allowed to react at 120° C. until the epoxy equivalent became 798. Subsequently, 110 parts of ethylene glycol monobutyl ether was added, and the mixture was allowed to react at 100° C.

Subsequently, 158 parts of diethanolamine and 95 parts of ketiminized diethylenetriamine (purity: 84%, a methyl isobutyl ketone solution) were added, and the mixture was allowed to react at 120° C. for 4 hours, after which 419 parts of ethylene glycol monobutyl ether was added. A solution of base resin No. 4 with a resin solids content of 80% was thus obtained.

The base resin No. 4 had an amine value of 50 mg KOH/g, a number average molecular weight of 2,300, and a catechol skeleton structure content of 23%. The ratio of the number of moles of epoxy groups in the epoxy resin (a1) to the number of moles of phenolic hydroxyl groups in the phenolic hydroxyl group-containing compound (a2) was 1.3.

Production Example 5

Production Example of Base Resin No. 5 Solution
(For Examples)

760 parts of jER828EL (Note 1), 166 parts of tert-butyl-catechol, and 0.2 parts of dimethylbenzylamine were placed in a 2-liter separable flask equipped with a thermometer, a reflux condenser, and a stirrer. The mixture was allowed to react at 120° C. until the epoxy equivalent became 418. Subsequently, 110 parts of ethylene glycol monobutyl ether was added, and the mixture was allowed to react at 100° C.

Subsequently, 200 parts of diethanolamine and 95 parts of ketiminized diethylenetriamine (purity: 84%, a methyl isobutyl ketone solution) were added, and the mixture was allowed to react at 120° C. for 4 hours, after which 104 parts of ethylene glycol monobutyl ether was added. A solution of base resin No. 5 with a resin solids content of 80% was thus obtained. The base resin No. 5 had an amine value of 106 mg KOH/g, a number average molecular weight of 1,200, and a catechol skeleton structure content of 15%.

The ratio of the number of moles of epoxy groups in the epoxy resin (a1) to the number of moles of phenolic hydroxyl groups in the phenolic hydroxyl group-containing compound (a2) was 2.0.

Production Example 6

Production Example of Base Resin No. 6 Solution 1,140 parts of jER828EL (Note 1), 456 parts of bisphenol A, and 0.2 parts of dimethylbenzylamine were placed in a 2-liter separable flask equipped with a thermometer, a reflux condenser, and a stirrer. The mixture was allowed to react at 120° C. until the epoxy equivalent became 1965. Subsequently, 110 parts of ethylene glycol monobutyl ether was added, and the mixture was allowed to react at 100° C.

Subsequently, 158 parts of diethanolamine and 95 parts of ketiminized diethylenetriamine (purity: 84%, a methyl isobutyl ketone solution) were added, and the mixture was allowed to react at 120° C. for 4 hours, after which 211 parts of ethylene glycol monobutyl ether was added. A solution of base resin No. 6 with a resin solids content of 80% was thus obtained. The base resin No. 6 had an amine value of 66 mg KOH/g, a number average molecular weight of 1,800, and a catechol skeleton structure content of 0%.

The ratio of the number of moles of epoxy groups in the epoxy resin (a1) to the number of moles of phenolic hydroxyl groups in the phenolic hydroxyl group-containing compound (a2) was 1.5.

Production Example 7

Production Example of Base Resin No. 7 Solution 684 parts of jER828EL (Note 1), 133 parts of tert-butyl-catechol, and 0.2 parts of dimethylbenzylamine were placed in a 2-liter separable flask equipped with a thermometer, a reflux condenser, and a stirrer. The mixture was allowed to react at 120° C. until the epoxy equivalent became 418. Subsequently, 110 parts of ethylene glycol monobutyl ether was added, and the mixture was allowed to react at 100° C.

Subsequently, 158 parts of diethanolamine and 95 parts of ketiminized diethylenetriamine (purity: 84%, a methyl isobutyl ketone solution) were added, and the mixture was allowed to react at 120° C. for 4 hours, after which 78 parts of ethylene glycol monobutyl ether was added. A solution of base resin No. 7 with a resin solids content of 80% was thus obtained. The base resin No. 7 had an amine value of 117 mg KOH/g, a number average molecular weight of 1,200, and a catechol skeleton structure content of 13%.

The ratio of the number of moles of epoxy groups in the epoxy resin (a1) to the number of moles of phenolic hydroxyl groups in the phenolic hydroxyl group-containing compound (a2) was 2.3.

Production Example 8

Production Example of Base Resin No. 8 Solution 2,280 parts of jER828EL (Note 1), 580 parts of bisphenol A, and 0.2 parts of dimethylbenzylamine were placed in a 2-liter separable flask equipped with a thermometer, a reflux condenser, and a stirrer. The mixture was allowed to react at 120° C. until the epoxy equivalent became 1965. Subsequently, 110 parts of ethylene glycol monobutyl ether was added, and the mixture was allowed to react at 100° C. Subsequently, 158 parts of diethanolamine and 95 parts of ketiminized diethylenetriamine (purity: 84%, a methyl isobutyl ketone solution) were added, and the mixture was allowed to react at 120° C. for 4 hours, after which 588 parts of ethylene glycol monobutyl ether was added. A solution of base resin No. 8 with a resin solids content of 80% was thus obtained. The base resin No. 8 had an amine value of 39 mg KOH/g, a number average molecular weight of 2,500, and a catechol skeleton structure content of 19%. The ratio of the number of moles of epoxy groups in the epoxy resin (a1) to the number of moles of phenolic hydroxyl groups in the phenolic hydroxyl group-containing compound (a2) was 1.2.

Table 1 below shows the formulations of Production Examples 1 to 8.

TABLE 1

| | | | | Production Example 1 | Production Example 2 | Production Example 3 | Production Example 4 | Production Example 5 | Production Example 6 | Production Example 7 | Production Example 8 |
|---|---|---|---|---|---|---|---|---|---|---|---|
| | | Base resin | | No. 1 | No. 2 | No. 3 | No. 4 | No. 5 | No. 6 | No. 7 | No. 8 |
| Formulation | A1 | Epoxy resin (a1) | jER828EL (Note 1) | 760 | 1,140 | 1,140 | 1,634 | 760 | 1,140 | 684 | 2,280 |
| | | | EPICLON HP-820 (Note 2) | 450 | | | | | | | |
| | | Phenolic hydroxyl group-containing compound (a2) | Bisphenol A | 456 | | | | | 456 | | |
| | | | Catechol | | 220 | | | | | | |
| | | | Tert-butylcatechol | | | 332 | 548 | 166 | | 133 | 580 |

TABLE 1-continued

|  |  |  | Production Example 1 | Production Example 2 | Production Example 3 | Production Example 4 | Production Example 5 | Production Example 6 | Production Example 7 | Production Example 8 |
|---|---|---|---|---|---|---|---|---|---|---|
|  | Catalyst | Dimethyl-benzylamine | 0.2 | 0.2 | 0.2 | 0.2 | 0.2 | 0.2 | 0.2 | 0.2 |
|  | Solvent | Ethylene glycol monobutyl ether | 110 | 110 | 110 | 110 | 110 | 110 | 110 | 110 |
|  | A2 | Diethanolamine | 158 | 158 | 158 | 158 | 158 | 158 | 158 | 158 |
|  |  | Ketiminized diethylenetriamine | 95 | 95 | 95 | 95 | 95 | 95 | 95 | 95 |
|  |  | Ethylene glycol monobutyl ether | 289 | 211 | 241 | 419 | 104 | 211 | 78 | 588 |
| Characteristic values |  | The ratio of the number of moles of epoxy groups in the epoxy resin (a1) to the number of moles of phenolic hydroxyl groups in the phenolic hydroxyl group-containing compound (a2) | 1.5 | 1.5 | 1.5 | 1.3 | 2.0 | 1.5 | 2.3 | 1.2 |
|  |  | Catechol skeleton structure (a) (%) | 18 | 14 | 20 | 23 | 15 | 0 | 13 | 19 |
|  |  | Amine value (mg KOH/g) | 64 | 76 | 71 | 50 | 106 | 66 | 117 | 39 |
|  |  | Number average molecular weight | 1,900 | 1,500 | 1,700 | 2,300 | 1,200 | 1,800 | 1,200 | 2,500 |

The proportions in the formulations are all by parts.

Production of Blocked Polyisocyanate (B)

Production Example 9

Production Example of Curing Agent 270 parts of Cosmonate M-200 (Note 3) and 127 parts of methyl isobutyl ketone were placed in a reaction vessel and heated to 70° C. 236 parts of ethylene glycol monobutyl ether was added thereto dropwise over 1 hour, and the mixture was heated to 100° C. While this temperature was maintained, the mixture was sampled over time. No absorption by unreacted isocyanate groups was observed by infrared absorption spectrometry. A curing agent with a resin solids content of 80% was thus obtained.

(Note 3) Cosmonate M-200: trade name, crude MDI, produced by Mitsui Chemicals, Inc.

Production Example 10

Production Example of Pigment Dispersion Resin 1,010 parts of jER828EL (see Note 1) was blended with 390 parts of bisphenol A, 240 parts of PLACCEL 212 (Note 4), and 0.2 parts of dimethylbenzylamine, and the mixture was allowed to react at 130° C. until the epoxy equivalent became about 1,090.

Subsequently, 134 parts of dimethylethanolamine and 150 parts of a 90% aqueous lactic acid solution were added, and the mixture was allowed to react at 120° C. for 4 hours. Afterward, methyl isobutyl ketone was added to adjust the solids content. An ammonium salt resin-type pigment dispersion resin with a solids content of 60% was thus obtained. The pigment dispersion resin had an ammonium salt concentration of 0.78 mmol/g.

(Note 4) PLACCEL 212: trade name, polycaprolactone diol, produced by Daicel Chemical Industries, Ltd., weight average molecular weight: about 1,250

Production Example 11

Production Example of Pigment-Dispersed Paste 8.3 parts (solids 5 parts) of the pigment dispersion resin with a solids content of 60% obtained in Production Example 10, 14.5 parts of titanium oxide, 7.0 parts of refined clay, 0.3 parts of carbon black, 1 part of dioctyltin oxide, 1 part of bismuth hydroxide, and 20.3 parts of deionized water were added, and dispersed in a ball mill for 20 hours. A pigment-dispersed paste with a solids content of 55% was thus obtained.

Preparation of Emulsion

Production Example 12

Production Example of Emulsion No. 1

87.5 parts (solids content: 70 parts) of base resin No. 1 obtained in Production Example 1 and 37.5 parts (solids content: 30 parts) of the curing agent obtained in Production Example 9 were mixed, and 12.1 parts of 10% formic acid was added. After the mixture was uniformly stirred, 156.9 parts of deionized water was added dropwise with vigorous stirring over a period of about 15 minutes to obtain emulsion No. 1 with a solids content of 34%.

Production Examples 13 to 19

Production Examples of Emulsions Nos. 2 to 8

Emulsions Nos. 2 to 8 were obtained in the same manner as in Production Example 12, except that the formulations shown in Table 2 were used.

TABLE 2

|  |  | Production Example 12 | Production Example 13 | Production Example 14 | Production Example 15 | Production Example 16 | Production Example 17 | Production Example 18 | Production Example 19 |
|---|---|---|---|---|---|---|---|---|---|
| Emulsion | | No. 1 | No. 2 | No. 3 | No. 4 | No. 5 | No. 6 | No. 7 | No. 8 |
| Formulation | Base resin No. 1 | 87.5 (70) | | | | | | | |
|  | Base resin No. 2 | | 87.5 (70) | | | | | | |
|  | Base resin No. 3 | | | 87.5 (70) | | | | | |
|  | Base resin No. 4 | | | | 87.5 (70) | | | | |
|  | Base resin No. 5 | | | | | 87.5 (70) | | | |
|  | Base resin No. 6 | | | | | | 87.5 (70) | | |
|  | Base resin No. 7 | | | | | | | 87.5 (70) | |
|  | Base resin No. 8 | | | | | | | | 87.5 (70) |
|  | Curing agent | 37.5 (30) | 37.5 (30) | 37.5 (30) | 37.5 (30) | 37.5 (30) | 37.5 (30) | 37.5 (30) | 37.5 (30) |
|  | 10% Formic acid | 12.1 | 12.1 | 12.1 | 12.1 | 12.1 | 12.1 | 12.1 | 12.1 |
|  | Deionized water | 156.9 | 156.9 | 156.9 | 156.9 | 156.9 | 156.9 | 156.9 | 156.9 |
| Emulsion with a solids content of 34% | | 294 (100) | 294 (100) | 294 (100) | 294 (100) | 294 (100) | 294 (100) | 294 (100) | 294 (100) |

The parenthesized numerals in the formulations denote the solids content.

Production of Cationic Electrodeposition Coating Composition

Example 1

294 parts (solids content: 100 parts) of emulsion No. 1 obtained in Production Example 12, 52.4 parts (solids content: 28.8 parts) of the 55% pigment dispersion paste obtained in Production Example 9, and 297.6 parts of deionized water were added. Cationic electrodeposition coating composition No. 1 with a solids content of 20% was thus obtained.

Examples 2 to 5 and Comparative Examples 1 to 3

Cationic electrodeposition coating compositions Nos. 2 to 8 were produced in the same manner as in Example 1, except that the formulations shown in Table 3 were used.

TABLE 3

|  |  |  | Example 1 | Example 2 | Example 3 | Example 4 | Example 5 | Comp. Ex. 1 | Comp. Ex. 2 | Comp. Ex. 3 |
|---|---|---|---|---|---|---|---|---|---|---|
| Cationic electrodeposition coating composition | | | No. 1 | No. 2 | No. 3 | No. 4 | No. 5 | No. 6 | No. 7 | No. 8 |
| Formulation | Emulsion | No. 1 | 294 (100) | | | | | | | |
|  | Emulsion | No. 2 | | 294 (100) | | | | | | |
|  | Emulsion | No. 3 | | | 294 (100) | | | | | |
|  | Emulsion | No. 4 | | | | 294 (100) | | | | |
|  | Emulsion | No. 5 | | | | | 294 (100) | | | |
|  | Emulsion | No. 6 | | | | | | 294 (100) | | |
|  | Emulsion | No. 7 | | | | | | | 294 (100) | |
|  | Emulsion | No. 8 | | | | | | | | 294 (100) |
|  | Pigment-dispersed paste | | 52.4 (28.8) | 52.4 (28.8) | 52.4 (28.8) | 52.4 (28.8) | 52.4 (28.8) | 52.4 (28.8) | 52.4 (28.8) | 52.4 (28.8) |
|  | Deionized water | | 297.6 | 297.6 | 297.6 | 297.6 | 297.6 | 297.6 | 297.6 | 297.6 |

TABLE 3-continued

|  | Example 1 | Example 2 | Example 3 | Example 4 | Example 5 | Comp. Ex. 1 | Comp. Ex. 2 | Comp. Ex. 3 |
|---|---|---|---|---|---|---|---|---|
| Cationic electrodeposition coating composition with a solids content of 20% | 644 (128.8) | 644 (128.8) | 644 (128.8) | 644 (128.8) | 644 (128.8) | 644 (128.8) | 644 (128.8) | 644 (128.8) |

The parenthesized numerals in the formulations denote the solids content.

Preparation of Plate Comprising Cationic Electrodeposition Coating Film

Cold-rolled steel plates (70 mm×150 mm×0.8 mm) subjected to chemical conversion treatment were immersed as "substrates" in baths of cationic electrodeposition coating compositions Nos. 1 to 8 that were adjusted to 28° C. to perform electrodeposition coating at 250V while adjusting the time for applying current. The resulting films were baked at 170° C. for 20 minutes to thereby obtain test plates with a dry film thickness of 10 μm and 20 μm. Each of the test plates was evaluated under the following conditions. Table 4 shows the results.

TABLE 4

|  |  |  | Example 1 | Example 2 | Example 3 | Example 4 | Example 5 | Comp. Ex. 1 | Comp. Ex.. 2 | Comp. Ex. 3 |
|---|---|---|---|---|---|---|---|---|---|---|
| Cationic electrodeposition coating composition | | | No. 1 | No. 2 | No. 3 | No. 4 | No. 5 | No. 6 | No. 7 | No. 8 |
| Test results | Throwing power (Note 5) | G side (mm) | 12 | 10 | 12 | 12 | 12 | 10 | 7 | 10 |
|  |  | A side (mm) | 15 | 15 | 15 | 15 | 15 | 15 | 15 | 15 |
|  |  | % | 80 | 67 | 80 | 80 | 80 | 67 | 47 | 67 |
|  | Finish (Note 6) | Dry film thickness 10 μm | A | A | A | A | A | C | A | C |
|  |  | Dry film thickness 20 μm | S | A | S | S | S | A | A | A |
|  | Anti-corrosion properties (Note 7) | Dry film thickness 10 μm | A | A | A | A | A | C | C | A |
|  |  | Dry film thickness 20 μm | S | S | S | S | S | A | A | S |
|  | Comprehensive evaluation | | S | S | S | S | S | C | C | C |

Figure 1:
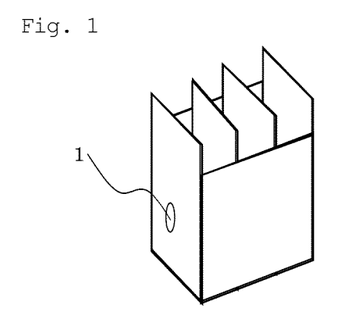
FIG. 1 is a model diagram of a "four-sheet box throwing power test jig" used in a throwing power test.
Figure 2:
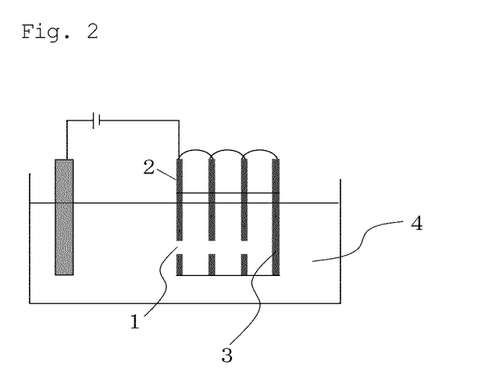
FIG. 2 illustrates the wiring for electrodeposition coating in the throwing power test.

(Note 5)
Throwing power: A "four-sheet box throwing power test jig" (see FIG. 1) having 8 mm diameter holes and four steel sheets positioned at intervals of 2 cm was wired as shown in FIG. 2. Of the four steel sheets shown in FIG. 2, the left surface of the outermost left steel sheet was called "surface A," and the right surface thereof was called "surface B." Similarly, the left and right surfaces of the second steel sheet from the left were called "surface C" and "surface D", respectively; the left and right surfaces of the third steel sheet from the left were called "surface E" and "surface F," respectively; and the left and right surfaces of the outermost right steel sheet were called "surface G" and "surface H," respectively. The surface A corresponds to the "outer sheet," while the surface G corresponds to the "inner sheet."
Using the apparatus shown in FIG. 2, electrodeposition coating was performed under the following conditions: a coating bath temperature of 28° C., a distance between the surface A and electrode of 10 cm, a current application time of 3 minutes, and a voltage required to achieve an outer sheet dry film thickness of 15 μm. The throwing power was evaluated based on the outer sheet dry film thickness, inner sheet dry film thickness, and throwing power (%) (= inner sheet dry film thickness/outer sheet dry film thickness × 100).
(Note 6)
Finish: The center line mean roughness (Ra) of each of the electrodeposition coating films (dry film thickness: 10 μm and 20 μm) obtained in the Examples and Comparative Examples was measured using Surfcom 301 (trade name, a surface roughness measuring instrument, produced by Mitutoyo Corporation) according to JIS B 0601 (Definition and Indication of Surface Roughness, 1982). The "center line mean roughness (Ra)" of each of the electrodeposition coating films was evaluated according to the following criteria:
S: Ra was less than 0.25.
A: Ra was not less than 0.25 and less than 0.30.
B: Ra was not less than 0.30 and less than 0.40.
C: Ra was not less than 0.40.
(Note 7)
Anti-corrosion properties: Each of the test plates comprising a cationic electrodeposition coating film with a dry film thickness of 10 μm or 20 μm obtained in the Examples and Comparative Examples was cross-cut with a knife so that the cut reached the substrate. Each test plate was then subjected to a salt spray test at 35° C. for 480 hours (a dry film thickness of 10 μm) or 840 hours (a dry film thickness of 20 μm) in accordance with JIS Z-2371. Anti-corrosion properties were evaluated based on the width of rust or blister from the cut according to the following criteria:
S: The maximum width of rust or blister from the cut was not more than 2.0 mm (on one side).
A: The maximum width of rust or blister from the cut was more than 2.0 mm and not more than 3.0 mm (on one side).
B: The maximum width of rust or blister from the cut was more than 3.0 mm and not more than 3.5 mm (on one side).
C: The maximum width of rust or blister from the cut was more than 3.5 mm (on one side).
(Note 8)
Comprehensive Evaluation In the field of cathodic electrodeposition coating to which the present invention pertains, excellent throwing power as well as excellent finish and anticorrosion properties of the obtained coating film are desired. Accordingly, the cationic electrodeposition coating compositions were comprehensively evaluated according to the following criteria:
S: The throwing power is not less than 60%, and finish with a dry film thickness of 10 μm, finish with a dry film thickness of 20 μm, anticorrosion properties with a dry film thickness of 10 μm, and anticorrosion properties with a dry film thickness of 20 μm are all evaluated as "S" or "A", and at least one of these properties is evaluated as "S".
A: The throwing power is not less than 60%, and finish with a dry film thickness of 10 μm, finish with a dry film thickness of 20 μm, anticorrosion properties with a dry film thickness of 10 μm, and anticorrosion properties with a dry film thickness of 20 μm are all evaluated as "A".
B: The throwing power is not less than 60%, and finish with a dry film thickness of 10 μm, finish with a dry film thickness of 20 μm, anticorrosion properties with a dry film thickness of 10 μm, and anticorrosion properties with a dry film thickness of 20 μm are all evaluated as "S", "A", or "B", and at least one of these properties is evaluated as "B".

TABLE 4-continued

|  | Example 1 | Example 2 | Example 3 | Example 4 | Example 5 | Comp. Ex. 1 | Comp. Ex.. 2 | Comp. Ex. 3 |
| --- | --- | --- | --- | --- | --- | --- | --- | --- |

C: The throwing power is less than 60%, or at least one of finish with a dry film thickness of 10 μm, finish with a dry film thickness of 20 μm, anticorrosion properties with a dry film thickness of 10 μm, and anticorrosion properties with a dry film thickness of 20 μm is evaluated as "C".

[Industrial Applicability] A coated article with excellent throwing power, excellent thin film finish and excellent thin film anti-corrosion properties can be provided.

[Description of the Reference Numerals]

1. a hole (with a diameter of 8 mm)
2. an outer sheet (surface A) of the four-sheet box throwing power test jig
3. an inner sheet (surface G) of the four-sheet box throwing power test jig
4. an electrodeposition coating bath (Note 5) Throwing power: A "four-sheet box throwing power test jig" (see FIG. 1) having 8 mm diameter holes and four steel sheets positioned at intervals of 2 cm was wired as shown in FIG. 2. Of the four steel sheets shown in FIG. 2, the left surface of the outermost left steel sheet was called "surface A," and the right surface thereof was called "surface B." Similarly, the left and right surfaces of the second steel sheet from the left were called "surface C" and "surface D", respectively; the left and right surfaces of the third steel sheet from the left were called "surface E" and "surface F," respectively; and the left and right surfaces of the outermost right steel sheet were called "surface G" and "surface H," respectively. The surface A corresponds to the "outer sheet," while the surface G corresponds to the "inner sheet."

Using the apparatus shown in FIG. 2, electrodeposition coating was performed under the following conditions: a coating bath temperature of 28° C., a distance between the surface A and electrode of 10 cm, a current application time of 3 minutes, and a voltage required to achieve an outer sheet dry film thickness of 15 μm. The throwing power was evaluated based on the outer sheet dry film thickness, inner sheet dry film thickness, and throwing power (%) (=inner sheet dry film thickness/outer sheet dry film thickness×100).

(Note 6) Finish: The center line mean roughness (Ra) of each of the electrodeposition coating films (dry film thickness: 10 μm and 20 μm) obtained in the Examples and Comparative Examples was measured using Surfcom 301 (trade name, a surface roughness measuring instrument, produced by Mitutoyo Corporation) according to JIS B 0601 (Definition and Indication of Surface Roughness, 1982). The "center line mean roughness (Ra)" of each of the electrodeposition coating films was evaluated according to the following criteria:

S: Ra was less than 0.25.
A: Ra was not less than 0.25 and less than 0.30.
B: Ra was not less than 0.30 and less than 0.40.
C: Ra was not less than 0.40.

(Note 7) Anti-corrosion properties: Each of the test plates comprising a cationic electrodeposition coating film with a dry film thickness of 10 μm or 20 μm obtained in the Examples and Comparative Examples was cross-cut with a knife so that the cut reached the substrate. Each test plate was then subjected to a salt spray test at 35° C. for 480 hours (a dry film thickness of 10 μm) or 840 hours (a dry film thickness of 20 μm) in accordance with JIS Z-2371. Anti-corrosion properties were evaluated based on the width of rust or blister from the cut according to the following criteria:

S: The maximum width of rust or blister from the cut was not more than 2.0 mm (on one side).
A: The maximum width of rust or blister from the cut was more than 2.0 mm and not more than 3.0 mm (on one side).
B: The maximum width of rust or blister from the cut was more than 3.0 mm and not more than 3.5 mm (on one side).
C: The maximum width of rust or blister from the cut was more than 3.5 mm (on one side).

(Note 8) Comprehensive Evaluation

In the field of cathodic electrodeposition coating to which the present invention pertains, excellent throwing power as well as excellent finish and anticorrosion properties of the obtained coating film are desired. Accordingly, the cationic electrodeposition coating compositions were comprehensively evaluated according to the following criteria:

S: The throwing power is not less than 60%, and finish with a dry film thickness of 10 μm, finish with a dry film thickness of 20 μm, anticorrosion properties with a dry film thickness of 10 μm, and anticorrosion properties with a dry film thickness of 20 μm are all evaluated as "S" or "A", and at least one of these properties is evaluated as "S".

A: The throwing power is not less than 60%, and finish with a dry film thickness of 10 μm, finish with a dry film thickness of 20 μm, anticorrosion properties with a dry film thickness of 10 μm, and anticorrosion properties with a dry film thickness of 20 μm are all evaluated as "A".

B: The throwing power is not less than 60%, and finish with a dry film thickness of 10 μm, finish with a dry film thickness of 20 μm, anticorrosion properties with a dry film thickness of 10 μm, and anticorrosion properties with a dry film thickness of 20 μm are all evaluated as "S", "A", or "B", and at least one of these properties is evaluated as "B".

C: The throwing power is less than 60%, or at least one of finish with a dry film thickness of 10 μm, finish with a dry film thickness of 20 μm, anticorrosion properties with a dry film thickness of 10 μm, and anticorrosion properties with a dry film thickness of 20 μm is evaluated as "C".

INDUSTRIAL APPLICABILITY

A coated article with excellent throwing power, excellent thin film finish and excellent thin film anti-corrosion properties can be provided.

DESCRIPTION OF THE REFERENCE NUMERALS 1. a hole (with a diameter of 8 mm)
2. an outer sheet (surface A) of the four-sheet box throwing power test jig
3. an inner sheet (surface G) of the four-sheet box throwing power test jig
4. an electrodeposition coating bath

The invention claimed is:

1. A cationic electrodeposition coating composition comprising a cationic epoxy resin (A) and a blocked polyisocyanate (B),
   wherein the cationic epoxy resin (A) is obtained by reacting an epoxy resin (A1) with an amino group-containing compound (A2),
   wherein the epoxy resin (A1) contains a catechol skeleton structure (a) represented by Formula (1) below Formula (1)

wherein the epoxy resin (A1) is obtained by reacting an epoxy resin (a1) containing at least one epoxy group per molecule and having an epoxy equivalent of 180 to 500 with a phenolic hydroxyl group-containing compound (a2) containing at least one phenolic hydroxyl group per molecule in amounts such that the ratio of the number of moles of epoxy groups in the epoxy resin (a1) to the number of moles of phenolic hydroxyl groups in the phenolic hydroxyl group-containing compound (a2) is in the range of 1.3 to 2.0, wherein the cationic epoxy resin (A) contains the catechol skeleton structure (a) in an amount of 5 to 40 mass %, based on the solids content of the resin (A), and wherein the blocked polyisocyanate (B) comprises an addition-reaction product of an aromatic polyisocyanate compound and an isocyanate blocking agent, wherein the aromatic polyisocyanate compound is at least one member selected from the group consisting of tolylene diisocyanate, xylylene diisocyanate, phenylene diisocyanate, diphenylmethane-2,4'-diisocyanate, diphenylmethane-4,4'-diisocyanate, and polymethylene polyphenyl isocyanate.

2. An electrodeposition coating method comprising the steps of immersing a substrate in an electrodeposition bath wherein the cationic electrodeposition coating composition of claim 1 is used as the electrodeposition bath, and applying a current using the substrate as a cathode.

* * * * *